United States Patent
Mayer et al.

(10) Patent No.: US 10,286,920 B2
(45) Date of Patent: May 14, 2019

(54) WORKING MACHINE AND METHOD FOR OPERATING SAID WORKING MACHINE

(71) Applicant: Putzmeister Engineering GmbH, Aichtal (DE)

(72) Inventors: Martin Mayer, Reutlingen (DE); Dirk Jahn, Nürtingen (DE)

(73) Assignee: PUTZMEISTER ENGINEERING GMBH, Aichtal (DE)

( * ) Notice: Subject to any disclaimer, the term of this patent is extended or adjusted under 35 U.S.C. 154(b) by 0 days.

(21) Appl. No.: 15/061,683

(22) Filed: Mar. 4, 2016

(65) Prior Publication Data

US 2016/0185359 A1 Jun. 30, 2016

Related U.S. Application Data

(63) Continuation of application No. PCT/EP2014/068809, filed on Sep. 4, 2014.

(30) Foreign Application Priority Data

Sep. 6, 2013 (DE) ........................ 10 2013 217 853

(51) Int. Cl.
*B60W 50/14* (2012.01)
*E04G 21/04* (2006.01)
*B60K 37/06* (2006.01)

(52) U.S. Cl.
CPC ............. *B60W 50/14* (2013.01); *B60K 37/06* (2013.01); *E04G 21/0436* (2013.01);
(Continued)

(58) Field of Classification Search
None
See application file for complete search history.

(56) References Cited

U.S. PATENT DOCUMENTS 4,053,868 A * 10/1977 Cox .................. B60Q 11/00
340/461
5,640,996 A * 6/1997 Schlecht ................ B66C 13/40
137/615
(Continued)

FOREIGN PATENT DOCUMENTS

CN 101419452 A 4/2009
CN 201649662 * 11/2010
(Continued)

OTHER PUBLICATIONS

Machine translation of CN 201649662, EPO Feb. 22, 2017.*
(Continued)

*Primary Examiner* — Kevin P Mahne
(74) *Attorney, Agent, or Firm* — Bose McKinney & Evans LLP

(57) ABSTRACT

This disclosure relates to a working machine having a vehicle which comprises a chassis, a drive motor and a monitoring unit, which is fixed to the vehicle, for outputting operating information and also warning and interference messages for the operation of the drive motor, having a working assembly, in particular concrete pump, which can be transported on the chassis and is supplied with drive energy from the drive motor in a working mode, and having a mobile remote control device, which can be operated remotely from the chassis, for the working assembly. The remote control device comprises a mobile monitoring unit which is designed to output warning and interference messages for the operation of the drive motor.

11 Claims, 2 Drawing Sheets

(52) U.S. Cl.
CPC .. *E04G 21/0445* (2013.01); *B60K 2350/1096* (2013.01); *B60K 2350/355* (2013.01); *B60W 2050/146* (2013.01)

(56) References Cited

U.S. PATENT DOCUMENTS

| | | | | |
|---|---|---|---|---|
| 6,164,923 | A * | 12/2000 | Mayer | F04B 17/05 417/212 |
| 6,493,616 | B1 | 12/2002 | Rossow et al. | |
| 6,778,097 | B1 * | 8/2004 | Kajita | E02F 3/437 340/12.5 |
| 8,319,666 | B2 * | 11/2012 | Weinmann | B64D 45/00 340/438 |
| 2003/0036832 | A1 | 2/2003 | Kokes et al. | |
| 2003/0147727 | A1 * | 8/2003 | Fujishima | E02F 3/435 414/200 |
| 2004/0119580 | A1 | 6/2004 | Spielman et al. | |
| 2005/0131600 | A1 | 6/2005 | Quigley et al. | |
| 2006/0092033 | A1 | 5/2006 | Hoff et al. | |
| 2008/0180523 | A1 * | 7/2008 | Stratton | G05D 1/0044 348/114 |
| 2009/0212905 | A1 | 8/2009 | Batz et al. | |
| 2010/0283625 | A1 * | 11/2010 | Inagawa | G08C 17/00 340/4.36 |
| 2013/0167227 | A1 * | 6/2013 | Miura | E02F 9/2054 726/19 |

FOREIGN PATENT DOCUMENTS

| | | | |
|---|---|---|---|
| DE | 196 35 200 | A1 | 3/1998 |
| DE | 103 57 492 | A1 | 7/2004 |
| DE | 10 2004 037 707 | A1 | 2/2006 |
| DE | 10 2005 037 567 | A1 | 5/2006 |
| DE | 600 31 416 | T2 | 9/2007 |
| DE | 10 2006 060 514 | A1 | 6/2008 |
| DE | 10 2008 051 982 | A1 | 6/2009 |
| DE | 10 2008 012 229 | A1 | 1/2010 |
| DE | 10 2008 047 425 | A1 | 4/2010 |
| EP | 1 284 472 | A2 | 2/2003 |
| JP | 57103391 | U | 12/1980 |
| JP | 07229168 | A * | 8/1995 |
| JP | 10272999 | A | 10/1998 |
| JP | 2000222691 | A | 8/2000 |
| JP | 2001090342 | A | 4/2001 |
| JP | 2002125275 | A * | 4/2002 |
| JP | 2006188133 | A | 7/2006 |

OTHER PUBLICATIONS

Horie, Fusama JP2002125275A, JPO English translaiton, Sep. 4, 2017.*
Hirabayashi, JP-07229168-A machine translation (Feb. 15, 2018) (Year: 2018).*
English translation of International Preliminary Report on Patentability, PCT/EP2014/068809.

* cited by examiner

WORKING MACHINE AND METHOD FOR OPERATING SAID WORKING MACHINE

RELATED APPLICATIONS

This application is a continuation of PCT/EP2014/068809, filed Sep. 4, 2014, which claims priority to DE 10 2013 217 853.0, filed Sep. 6, 2013, both of which are hereby incorporated herein by reference in their entireties.

BACKGROUND

The invention relates to a working machine, in particular a truck-mounted concrete pump, concrete mixer or mobile crane having a vehicle which comprises a chassis, a drive engine and a control unit which is fixed to the vehicle and has the purpose of outputting operating information as well as warning messages and fault messages for the operation of the drive engine, a working assembly, in particular concrete pump, which can be transported on the chassis, and in a working mode is supplied with drive energy from the drive engine, and a mobile remote-control device, which can be operated at a distance from the chassis, for the working assembly. The invention also relates to a method for operating such a working machine.

In conventional truck-mounted concrete pumps, the vehicle, as a truck underbody is configured to transport the built-on assembly, that is to say the concrete pump with distributor boom, in a travel mode in road traffic to the location of use. The drive engine of the motor vehicle is also used in situ to drive the hydraulic pumps for the working mode of the working assembly. In this context, the machinist can be removed from the vehicle in a working range in order to control the concrete distributor boom from a favorable operator control location by means of the remote-control device. In this context, it is problematic if possible engine faults are displayed only in the unoccupied driver's cab.

SUMMARY

Taking the above as a basis, this disclosure further improves the working machines and methods known in the prior art and provides increased operational safety and operational friendliness as well as the protection of investments.

This disclosure is based on the idea that engine status information which was previously conveyed only to the driver of the vehicle is also made available for the machinist at the construction site. Accordingly, according to this disclosure it is proposed that the remote-control device comprises a mobile control unit which is designed to output at least warning messages and fault messages for the operation of the drive engine. Such messages are of essential significance for the undisrupted operation of the engine and therefore also the subsequent operation of the working assembly. Unnoticed faults can lead not only to engine damage but also entail fatal damage to the working assembly, for example when concrete hardens in the feed line. For example, critical fuel levels, oil levels, coolant levels and fuel pressures, oil pressures and coolant pressures are detected for the generation of the warning messages and fault messages. Given prompt intervention in the process of the working machine, it is therefore possible to avert damage to the investment goods.

A particular aspect of this disclosure is directed to a truck-mounted concrete pump as a working machine which has the following features:

a road vehicle which comprises a chassis, a drive engine and a control unit which is fixed to the vehicle, in a driver's cab, for outputting operating information and warning messages and fault messages for the operation, in particular the road travel mode of the drive engine, a working assembly, in the form of a concrete pump with concrete distributor boom connected thereto, which working assembly is built on the chassis, can be transported thereon and is supplied in a working mode with drive energy from the drive engine in order to feed concrete, a mobile remote-control device which can be operated at a distance from the chassis and is configured as a remote control device to operate the concrete distributor boom, wherein the remote-control device comprises a mobile control unit for the drive engine, and the mobile control unit is designed to simultaneously and/or in parallel output at least one of the warning messages and fault messages which are output in the driver's cab.

Such truck-mounted concrete pumps are usually built on a road vehicle which is conceived by a vehicle manufacturer with an engine management system for road traffic, while the vehicle body is made separately by a concrete pump manufacturer. Owing to the range of the concrete distributor boom, a remote control device for the working mode is expedient, but the operator then loses, as it were, eye contact-based control over the drive engine. This disclosure remedies this by making possible parallel outputting of warning messages and fault messages in the driver's cab and on the remote control device.

In order to make available the operating data it is advantageous if the mobile control unit is connected to a vehicle-side interface, for example a CAN bus, via a preferably wireless transmission link.

In order to increase the operational safety, the control unit which is fixed to the vehicle and the mobile control unit are actuated in parallel in order to provide a simultaneous, mirrored display of warning messages and fault messages.

A further improvement provides that the mobile control unit has a display device, in particular a screen and/or warning lights, for visually displaying the warning messages and fault messages.

For flexible use it is advantageous if the mobile control unit is configured at the same time to output operator control information for the remote control of the working assembly.

Generally, the warning messages and fault messages are preferably in the form of symbolic or textural representations or acoustic signals or haptic feedback (vibration) suitable and intended for informing an operator about malfunctions, faults or risks for the operation of the drive engine.

It is also advantageous to have an information processor for providing information such as the cause of a fault, urgency and need for action, which is linked to the warning messages and fault messages.

In order, if appropriate, to be able to avert consequential damage, it is advantageous if the mobile control unit has an intervention device for the automatic or manual intervention in a function of the drive engine and/or of the working assembly in accordance with the warning messages and fault messages in the working mode.

In this context it is also favorable if a transmission device, which can preferably be connected via a mobile radio network to a control center which is remote from the vehicle is configured to transmit warning messages and fault messages and, if appropriate, corresponding operating information of the drive engine and/or working assembly in the working mode.

At least one warning message and fault message which is output on the control unit which is fixed to the vehicle and on the mobile control unit advantageously relates to a parameter from the group of the fuel supply, oil temperature, oil level, coolant level, rotational speed of the engine, with the result that critical states of the engine also do not remain unnoticed in the construction site mode.

In terms of the method, the following measures are proposed in order to achieve the object mentioned at the beginning:

outputting operating information and, if appropriate, warning messages and fault messages for the operation of the drive engine of the vehicle on a control unit which is fixed to the vehicle, supplying the working assembly which is built on the chassis with drive energy from the drive engine in a working mode, operating the working assembly at a distance from the vehicle, by means of a mobile remote-control device and outputting warning messages and fault messages for the operation of the drive engine on a mobile control unit of the remote-control device.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
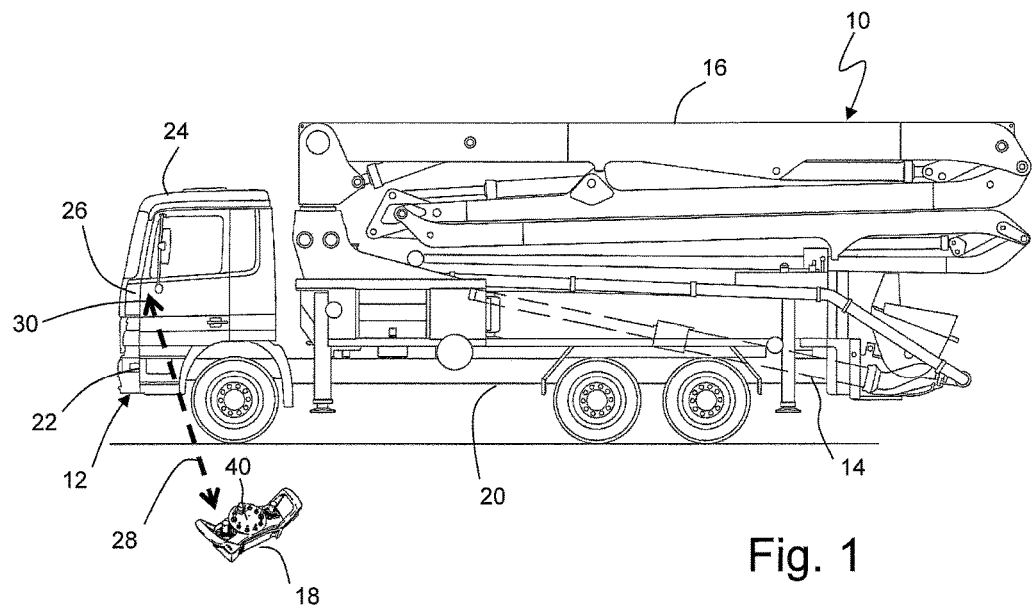
FIG. 1 shows a side view of a truck-mounted concrete pump with a remote-control device.

The mobile working machine 10 which is shown in FIG. 1 comprises, as a truck-mounted concrete pump, a vehicle 12 and a working assembly which is built thereon and is in the form of a concrete pump 14 with a connected concrete distributor boom 16. The working assembly can be remote controlled by an operator from variable operator control positions by means of a portable remote-control device 18 in the working mode, i.e., when the vehicle is supported in a stationary fashion.

The vehicle 12 which is in a travel mode and can move in road traffic has a chassis 20, a drive engine 22 and a driver's cab 24 in which a control unit 26 which is fixed to the vehicle, in particular a dashboard with an onboard computer for outputting operating information and warning messages and fault messages for the travel mode, is arranged. The vehicle 12 or the underbody is generally fabricated in a largely standardized fashion for road traffic by a manufacturer of trucks, while particular adaptations of the vehicle body are necessary for the working mode. In particular, the drive engine is also used to supply the drive energy for hydraulic pumps of the working assembly 14. Therefore, certain status information about the drive engine are of particular interest even in the working mode.

In order to permit an exchange of information, the remote-control device 18 is connected via a (wireless) transmission link to a vehicle-side interface 30. The latter also permits, for example via a CAN bus, the provision of information in the same way as it is output to the driver of the vehicle on the dashboard.

Figure 2:
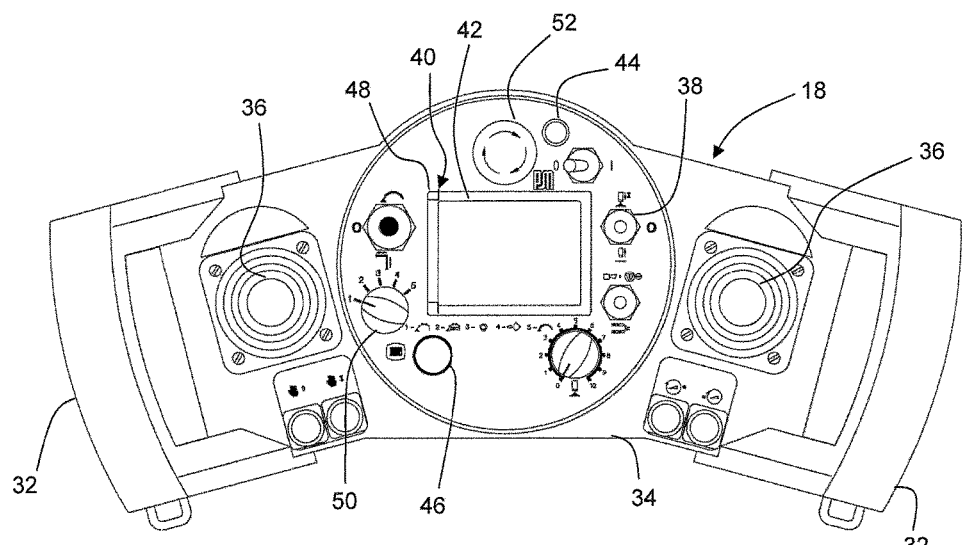
FIG. 2 shows a plan view of the remote-control device.

As is apparent from FIG. 2, the remote-control device 18 comprises a housing 34 which is equipped with carrying handles 32. In the housing 34, in addition to various operator control elements for the working mode, for example joysticks 36 for the movement control of the distributor boom 16 and toggle switches 38 for the pumping direction a mobile control unit 40 is integrated, which mobile control unit 40 is also configured to output warning messages and fault messages which are significant for the operation of the drive engine. For this purpose, the mobile control unit 40 comprises a screen 42 and warning lights 44 as well, if appropriate, acoustic warning devices 46.

The computerized mobile control unit 40 can be supplied with engine operating data in parallel with the on-board computer via the interface 30, with the result that a mirrored or content display of warning messages and fault messages is possible. Furthermore, the mobile control unit 40 also contains an information processor 48 and software which is configured to provide information such as the cause of a fault, urgency and need for action, which is linked to the warning messages and fault messages. The mobile control unit 40 also expediently has an intervention device 50 for intervention in a function of the drive engine 22 and/or the working assembly 14 as a function of the warning messages and fault messages. For example, in the case of imminent engine damage the rotational speed of the engine could be lowered manually (or if appropriate automatically) to such an extent that an emergency mode for emptying the concrete feed line is still possible.

Basically, it is also possible to connect a transmission device 52 via a mobile radio network to a control center which is remote from the vehicle, in order to transmit warning messages and fault messages and, if appropriate, corresponding operating information of the drive engine 22 and/or working assembly 14 in the working mode. For example, in the event of a failure of the drive engine 22 the control center could be informed about this, with the result that further supplies of fresh concrete could still be prevented as far as possible.

Figure 3:
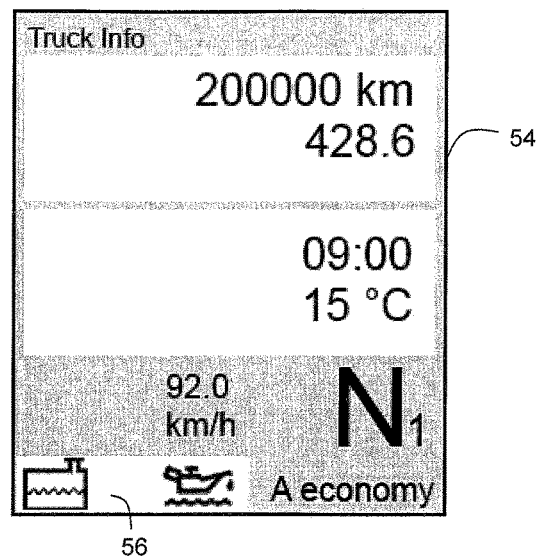
FIG. 3 shows a screen content of a control unit which is fixed to the vehicle.

FIG. 3 shows a screen of the on-board computer or of the control unit 26 which is fixed to the vehicle in the travel mode. Operating information such as the kilometer reading and a velocity are displayed. In addition, corresponding warning messages and fault messages such as a fuel reserve or lack of engine oil in the form of symbolic representations can be included in a warning field 56 in the event of engine faults which are imminent or have occurred. Such messages can also be generated in the working mode, but possibly remain unnoticed in the driver's cab 24. In order to avert possible considerable damage here, the warning messages and fault messages are output in parallel on the screen 42 of the mobile control unit 40.

Figure 4:
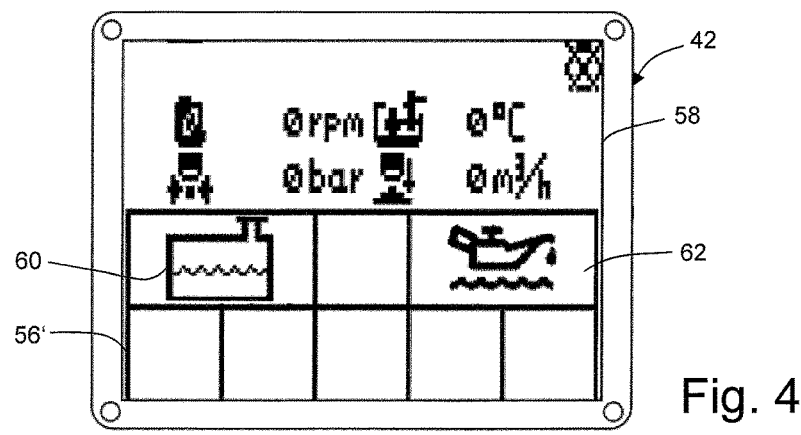
FIGS. 4 and 5 show a screen content of a mobile control unit for operating information and warnings.

FIG. 4 shows a screen content or a menu window 58 on the screen 42, in the lower warning field 56' of which the warning symbols 60, 62 are mirrored in accordance with the display 56 which is fixed to the vehicle. As a result, the machinist who is possibly at a distance from the vehicle 12 is alerted to malfunctions, faults or risks for the operation of the drive engine and possible consequential damage for the operation of the working assembly.

Figure 5:
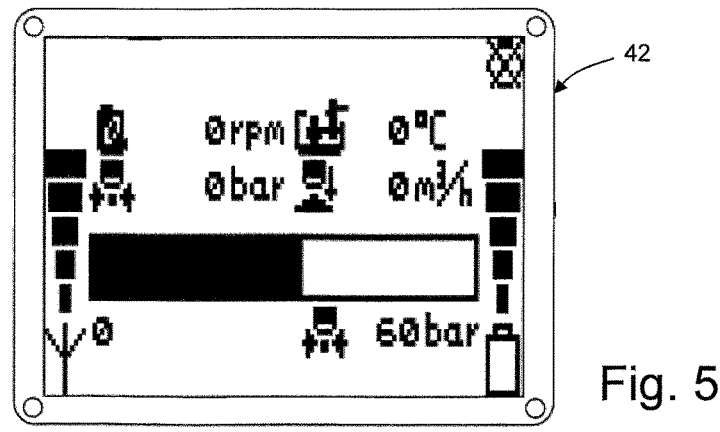

In the normal mode, different operator control information and operating information for the remote control of the working assembly 14 is output on the screen 42 of the mobile control unit in a menu-controlled fashion, as is illustrated in FIG. 5. For example, the hydraulic pressure can then be displayed instead of the warning field 56'.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A truck-mounted concrete pump, comprising:
   a) a road vehicle comprising a chassis, a drive engine and a control unit, the control unit having a display and being fixed to the vehicle and located in a driver's cab, the control unit configured to output operating information and warning and fault messages for operation of the drive engine;
   b) a concrete pump built on the chassis and having a distributor boom connected thereto, in a working mode the concrete pump being supplied with drive energy from the drive engine to feed concrete;
   c) a mobile remote-control operable at a distance from the chassis, the mobile remote-control configured to operate the concrete distributor boom and configured to simultaneously output at least one of the warning and fault messages which are output in the driver's cab; and
   d) the mobile remote-control further configured for manual operator intervention to change one or more conditions of the drive engine associated with the warning or fault messages.

2. The concrete pump as claimed in claim 1, wherein the mobile remote-control unit is connected to a vehicle-side interface.

3. The concrete pump as claimed in claim 2, wherein the mobile remote-control unit is connected to the vehicle-side interface via a wireless transmission link.

4. The concrete pump as claimed in 1, wherein the control unit fixed to the vehicle and the mobile remote-control unit are configured for actuation in parallel in order to simultaneously display warning and fault messages.

5. The concrete pump as claimed in claim 1, wherein the mobile remote-control unit has a display device.

6. The concrete pump as claimed in claim 5, wherein the display device comprises a screen and/or warning lights configured to visually display the warning and fault messages.

7. The concrete pump as claimed in claim 1, wherein the mobile remote-control unit is configured to output operator control information.

8. The concrete pump as claimed in claim 1, wherein the warning and fault messages are provided in the form of symbolic or textural representations or acoustic signals or haptic feedback for informing an operator about malfunctions, faults or risks for the operation of the traction engine.

9. The concrete pump as claimed in claim 1, further comprising an information processor for providing information linked to the warning and fault messages.

10. The concrete pump as claimed in claim 1, further comprising a transmission that is connectable via a mobile radio network to a control center which is remote from the vehicle, the transmission configured to transmit warning and fault messages and corresponding operating information of the drive engine and/or concrete pump in the working mode.

11. The concrete pump as claimed in claim 1, wherein at least one the warning and fault messages relates to fuel supply, oil temperature, oil level, coolant level, and/or rotational speed of the drive engine.

* * * * *